(12) United States Patent
Segman

(10) Patent No.: US 7,271,840 B2
(45) Date of Patent: Sep. 18, 2007

(54) METHOD FOR DETERMINING ENTROPY OF A PIXEL OF A REAL TIME STREAMING DIGITAL VIDEO IMAGE SIGNAL, AND APPLICATIONS THEREOF

(75) Inventor: Yosef Segman, Zichron Yaacov (IL)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 10/284,280

(22) Filed: Oct. 31, 2002

(65) Prior Publication Data

US 2003/0081677 A1 May 1, 2003

Related U.S. Application Data

(60) Provisional application No. 60/330,785, filed on Oct. 31, 2001.

(51) Int. Cl.
*H04N 7/01* (2006.01)
(52) U.S. Cl. .................. 348/441; 348/443; 348/458
(58) Field of Classification Search ............... 348/441, 348/443, 459; 375/240.12, 240.13; 382/170, 382/100, 107; *H04N 7/01*
See application file for complete search history.

(56) References Cited

U.S. PATENT DOCUMENTS

| | | | |
|---|---|---|---|
| 4,876,596 A | 10/1989 | Faroudja et al. | |
| 4,967,271 A | 10/1990 | Campbell et al. | |
| 4,982,280 A | 1/1991 | Lyon et al. | |
| 5,291,280 A | 3/1994 | Faroudja et al. | |
| 5,452,011 A | 9/1995 | Martin et al. | |
| 5,488,422 A | 1/1996 | Faroudja et al. | |
| 5,844,616 A * | 12/1998 | Collet et al. | 348/441 |
| 6,108,380 A * | 8/2000 | Miyaji et al. | 375/240.03 |
| 6,239,842 B1 * | 5/2001 | Segman | 348/448 |
| 6,784,942 B2 * | 8/2004 | Selby et al. | 348/452 |
| 2003/0068085 A1 * | 4/2003 | Said | 382/170 |
| 2003/0086496 A1 * | 5/2003 | Zhang et al. | 375/240.16 |

FOREIGN PATENT DOCUMENTS

JP 11-145233 8/2000

OTHER PUBLICATIONS

Schu et al, "System on Silicon- IC for Motion Compensated Scan Rate Conversion, Picture-In-Picture Processing, Split Screen Applications and Display Processing", *Trans. On Consumer Elect.*, no p. nos. given, Aug. 1999.

\* cited by examiner

*Primary Examiner*—Trang U. Tran
(74) *Attorney, Agent, or Firm*—Sharon Wong

(57) ABSTRACT

Method for determining entropy of a pixel of a real time streaming digital video image signal, particularly applicable for identifying the origin of, and processing, in real time, pixels of interlaced, non-interlaced, or de-interlaced, streaming digital video image signals, and for correcting errors produced during editing of streaming digital video image signals. Based upon the fundamental aspect of determining the degree or extent of randomness or disorder, or entropy, and determining the fluctuation thereof, of each pixel relative to inter-local neighborhoods and intra-local neighborhoods of selected pixels originating from the streaming digital video image input signal. Automatically detects and identifies original mode of the video input signal (film movie, video camera, or graphics). Independent of type of mode conversion used for generating the original video input signal, and not based upon an 'a priori' type of pattern recognition method.

80 Claims, 1 Drawing Sheet

METHOD FOR DETERMINING ENTROPY OF A PIXEL OF A REAL TIME STREAMING DIGITAL VIDEO IMAGE SIGNAL, AND APPLICATIONS THEREOF

This claims the benefit of priority of U.S. Provisional Patent Application No. 60/330,785, filed Oct. 31, 2001, entitled: "Method For Determining Entropy Of A Pixel Of A Real time Digital Video Stream Signal, And Applications Thereof".

FIELD AND BACKGROUND OF THE INVENTION

The present invention relates to the field of processing and analyzing streaming digital video image signals and, more particularly, to a method for determining entropy of a pixel of a real time streaming digital video signal. The method of the present invention is particularly applicable for identifying the origin of, and processing, in real time, pixels of interlaced, non-interlaced, or de-interlaced, streaming digital video image signals, and for correcting errors produced during editing of streaming digital video image signals.

A streaming digital video image signal is represented as continuous sequences of either fields, according to an interlaced scan refresh format, or frames, according to a non-interlaced or progressive scan refresh format. In the interlaced scan format, a digital video image signal in the form of a single image (frame) is represented using a pair of fields. One field of the pair features pixels located in alternate horizontal lines (rows), for example, odd numbered horizontal lines, of the field matrix. The second field of the pair features pixels located in the same field matrix only in the corresponding horizontal lines, for example, even numbered horizontal lines, which are missing pixels in the first field, such that portions of the image not represented in the first field are thereby represented in the second field. In the interlaced scan format, each field of image data is scanned twice, once for the odd numbered horizontal lines of the field, and another time for the even numbered horizontal lines of the field, in order to have all of the horizontal lines of the odd field followed by all of the horizontal lines of the even field. The pair of fields of odd and even horizontal lines in interlaced video constitute the frame (one full resolution picture or image). By contrast, in the non-interlaced or progressive scan format, a digital video image signal is represented in its entirety using only a single field which includes pixels in all horizontal lines of the field matrix. Here, each frame or field of image data is scanned once from the top horizontal line to the bottom horizontal line without requiring interlacing action between two fields.

In an interlaced scan format, the first and second fields of a pair are scanned consecutively on a video display monitor at a pre-determined rate of a number of, for example, 60, fields per second, in order to reconstruct single image frames on the display at a standard broadcasting interlaced scan rate of a number of, for example, 30, frames per second. In more recently developed video representation techniques, such as non-interlaced or progressive scan format, frames are progressively scanned on a display at a standard progressive display rate of 60 frames per second.

Application of current interlaced scan format to television is typically according to the NTSC (National Television System Committee) standard format, or, according to the PAL (Phase Alternation by Line) standard format. In the NTSC format, there are 262.5 horizontal scanning lines per field (including one odd numbered field, and one even numbered field), translating to 525 scanning lines per frame, with an established scan rate of (60 fields) 30 frames per second. In the PAL format, there are 312.5 horizontal scanning lines per field (including one odd numbered field, and one even numbered field), translating to 625 scanning lines per frame, with an established scan rate of (50 fields) 25 frames per second.

Currently, regular video broadcasting by systems using NTSA, PAL, or, SECAM, types of standard formats, often incorporates a mixing of video image signals acquired by more than one type of video camera source, such as various combinations of interlaced video, non-interlaced or progressive video, non-interlaced Hollywood movie film, and, non-interlaced computer graphics, camera sources. If the camera source acquires image signals according to a non-interlaced or progressive type format and the broadcasting is of an interlaced type format, image signals acquired by the non-interlaced or progressive camera source need to be converted into an interlaced type format. Alternatively, if the broadcasting is of a non-interlaced or progressive type format, such as an HDTV progressive type format, and the digital video image signal display is of an interlaced type format, here, the broadcast video image signals need to be converted into an interlaced type format for proper display.

Currently, in most broadcasting systems, non-interlaced or progressive image sources are converted into interlaced formats to match the broadcasting interlaced format. However, if the broadcasting is of an interlaced type format, of a mix of originally interlaced video image signals, of interlaced originally non-interlaced video images, and of interlaced originally progressive video image signals, and the digital video image signal display is of a non-interlaced or progressive type format, here, the broadcast interlaced digital video image signals need to be de-interlaced into a non-interlaced or progressive type format.

New high quality, high resolution, TV display systems and devices, such as CRT PC monitors, high definition television (HDTV) desktop or workstation display monitors, flat liquid crystal device (LCD) panels, plasma display panels (PDP), home theater projectors, and video equipment, operate according to non-interlaced progressive high resolution scan format, such as VGA(480 lines×640 columns per frame), SVGA(600 lines×800 columns per frame), XGA(768 lines×1024 columns per frame), and UXGA(1200 lines×1600 columns per frame) to scan and display digital video images. An example showing application of de-interlacing interlaced digital video image signals involves the use of a typical LCD display having 480 horizontal scanning lines with 640 dots per scanning line (VGA system). Since LCD display systems are designed to scan according to a non-interlaced progressive format, in order to display NTSC (525 lines per frame) or PAL (625 lines per frame) digital video image signals on the LCD display, interlaced digital video image signals need to be converted into de-interlaced digital video image signals for proper display on the LCD.

In order to properly convert broadcast digital video image signals into appropriately corresponding interlaced or progressive digital video image signal display formats, there is a need for real time identifying the original mode or type of camera source of the digital video image signals. There are various prior art teachings of methods, device, and systems, for identifying the original mode or type of camera source of digital video image signals.

In U.S. Pat. No. 4,982,280, issued to Lyon et al., there is disclosed a motion sequence pattern detector which automatically detects a periodic pattern of motion sequences within a succession of fields of video image signals, characterized by film mode or progressive scan mode, thereby indicating that a particular sequence originated from cinematographic film, or, from a progressive scan camera. Therein is particularly described a three-to-two (3:2) film to video sequence mode detector which automatically detects the presence of sequences of a video stream originating from transfer from cinematographic film according to a 3:2 pull down conversion performed during the transfer. The invention disclosed by Lyon et al. also includes a resynchronization procedure for automatically resynchronizing to film mode when a video splice in video originating with film occurs on a boundary other than a 3:2 pull down conversion field boundary.

The motion sequence pattern detector of Lyon et al. is based on using a pixel displacement circuit for detecting displacement of a pixel within successive video frames for each field of the video sequence and having a motion signal output indicative of displacement due to the unique properties attributable to the video sequence. Accordingly, the teachings of Lyon et al. focus and entirely depend upon, and are therefore limited to, using a process of pattern recognition, in general, and pattern recognition of motion sequences, in particular, among sequences of fields in a streaming video signal.

In U.S. Pat. No. 5,291,280, issued to Faroudja et al., there are disclosed techniques for motion detection between even and odd fields within 2:1 interlaced conversion television standard. Therein is described a field motion detector for use within a 2:1 interlaced temporal video signal stream in conjunction with a frame motion detector operating upon the same signal stream, in order to identify motion on a field by field basis. Similar to operation of the motion sequence pattern detector disclosed by Lyon et al., the teachings of Faroudja et al. focus and entirely depend upon, and are therefore limited to, using a process of pattern recognition, in general, and, pattern recognition of motion sequences, in particular, among sequences of fields in a streaming video signal.

In U.S. Pat. No. 5,452,011, issued to Martin et al., there is disclosed a method and apparatus for determining if a streaming video signal has characteristics of a signal originating from an interlaced video mode, or, has characteristics of a signal originating from a non-interlaced film mode. The teachings of Martin et al. are based upon, and limited to, evaluating 'accumulated', not 'individual', differences of pixels of two fields in successive frames of the video signal, and comparing the accumulated differences to threshold values, for making decisions regarding further processing of the video signal.

In U.S. Pat. No. 4,967,271, issued to Campbell et al., there is disclosed a television scan line doubler, for increasing the number of apparent scan lines of a display device, including a temporal median filter for pixel interpolation and a frame-by-frame based motion detector. The invention is based on methods of interpolation and use of an interpolator unit.

In Japanese Patent Application Publication No. 00341648 JP, published Dec. 08, 2000, of Japanese Patent Application No. 11145233, filed May 25, 1999, of applicant Pioneer Electronic Corp., there is disclosed a video signal converting and mode detector device for speedily identifying whether or not an input video signal is a telecine-converted video signal from a projection or movie film, or, the video signal of a standard television system, on the basis of respective correlation values between an interpolation field and fields before and after one field period. A motion detector detects the motion of an image and a scan line interpolator performs scan line interpolating processing corresponding to detection outputs from a mode detector and the motion detector.

In the publication, *Transactions On Consumer Electronics,* August 1999, by Schu, M. et al., of Infineon Technologies AG, Munich, Germany, there is described a "System On Silicon—IC For Motion Compensated Scan Rate Conversion, Picture-In-Picture processing, Split Screen Applications And display Processing", including the use of a method for "3-D-predictive motion estimation". The described 3-D predictive motion estimation algorithm uses vector information of previously calculated blocks (fields) in advance to calculate the motion vector for the actual block (field). The source vectors are taken from the same temporal plane (spatial components) and the previous temporal plane (temporal components) and used as prediction. Combinations of these predictors and a zero-vector are used for building a set of candidate vectors for the actual block (field). The block (field) positions pointed to by these candidates are evaluated by comparison criteria, in particular, using Summed Absolute Difference (SAD) criteria, where the absolute difference between the blocks (fields) is summed pixel by pixel. The best match is chosen and its assigned vector is taken as predictor for the next blocks (fields) and for use in the scan rate conversion.

Application and suitability of any of these particular techniques for identifying the original mode or type of camera source of digital video image signals strongly depends on the resulting video image quality. Moreover, success in applying a particular mode or motion identification technique varies with overall system operating conditions, and/or, with specific video image signal processing conditions.

Due to the fact that TV station and video broadcasting systems are increasingly broadcasting various mixes of video image signals acquired by a variety of video camera sources such as interlaced video, non-interlaced or progressive video, non-interlaced Hollywood movie film, and non-interlaced computer graphics, camera sources, operating according to different formats, coupled with the continued widespread usage of interlaced format TV display devices and systems, along with increasing appearance and usage of progressive TV display devices and systems, there is a significant on-going need for developing new approaches and techniques which are applicable for real time identifying the original mode or type of camera source of digital video image signals, in order to properly convert the broadcast digital video image signals into an interlaced or progressive format corresponding to the digital video image signal display format. Moreover, there is a corresponding on-going need for developing new approaches and techniques which are applicable for real time correcting errors produced during editing of the digital video image signals.

There is thus a need for, and it would be highly advantageous to have a method for determining entropy of a pixel of a real time streaming digital video image signal, which is particularly applicable for identifying the origin of, and processing, in real time, pixels of interlaced, non-interlaced, or de-interlaced, streaming digital video image signals, and for correcting errors produced during editing of streaming digital video image signals.

Moreover, there is a need for such an invention for analyzing and processing fields of pixels of a streaming digital video image signal which (1) is independent of the type of the mode conversion used for generating the original streaming digital video image input signal, for example, a 3:2 or 2:2 pull down mode conversion method for converting film movies appropriate for a DVD disk player operating with a video NTSC or PAL format, and (2) is not based upon known methods or techniques involving 'a priori' pattern recognition based upon known methods or techniques involving evaluation of sets of 'accumulated' or 'summed' differences, instead of 'individual' differences, of pixel values located in successive fields of the streaming digital video image signal.

SUMMARY OF THE INVENTION

The present invention relates to a method for determining entropy of a pixel of a real time streaming digital video image signal. The method of the present invention is particularly applicable for identifying the origin of, and processing, in real time, pixels of interlaced, non-interlaced, or de-interlaced, streaming digital video image signals, and for correcting errors produced during editing of streaming digital video image signals.

The method of the present invention is based upon determining the degree or extent of randomness or disorder, herein, referred to as the entropy, and determining the fluctuation thereof, herein, referred to as the entropy fluctuation, of each pixel relative to inter-local neighborhoods and intra-local neighborhoods of pluralities of selected pixels originating from the streaming digital video image signal. This fundamental aspect of 'pixel entropy', for characterizing the degree or extent of randomness or disorder, and fluctuation thereof, of a single pixel based on its surrounding local neighborhood, of a streaming digital video image signal, enables one to efficiently determine appropriate further processing of the pixels of the streaming digital video image signal. The method features a sequence of unique and inventive steps and sub-steps for determining the entropy, and fluctuation thereof, of each individual pixel of a plurality of pixels of a streaming digital video image signal.

The present invention successfully meets the on-going need for developing new approaches and techniques in the electronics industry, in the field of processing and analyzing streaming digital video image signals which are applicable for identifying the original mode of streaming digital video image signals and correcting errors produced during editing of the streaming digital video image signals.

Thus, according to the present invention, there is provided a method for determining entropy of a pixel of a real time streaming digital video image signal, comprising the steps of: (a) receiving and characterizing the streaming digital video image input signal during a pre-determined time interval; (b) assigning and characterizing a local neighborhood of neighboring pixels to each input image pixel of the streaming digital video image input signal, in a temporal interlaced sequence of three consecutive fields in a global input grid of pixels included in the streaming digital video input image signal, the three consecutive fields being a previous field, a next field, and a current field; and (c) determining the entropy of each virtual pixel, of each previous pixel, and of each next pixel, in the temporal interlaced sequence of the three consecutive fields, relative to the assigned and characterized local neighborhoods of the neighboring pixels, the determining comprising the steps of: (i) calculating values of pixel inter-local neighborhood parameters for each previous pixel in the previous field, and for each next pixel in the next field, whereby each value of each pixel inter-local neighborhood parameter represents a regional sum of inter-local neighborhood weighted distances measured between the neighboring pixels located in subsets of the assigned and characterized local neighborhood of each virtual pixel in the current field, and the assigned and characterized local neighborhood of each previous pixel in the previous field, and of each next pixel, in the next field, respectively; (ii) calculating a value of a virtual-pixel intra-local neighborhood parameter, for each virtual pixel in the current field; (iii) adjusting a value of a pixel entropy counter for each previous pixel in the previous field, for each next pixel in the next field, and for each virtual pixel in the current field; and (iv) calculating a value of the entropy of each previous pixel in the previous field, of each next pixel in the next field, and of each virtual pixel in the current field, from the values of the pixel entropy counters of the pixels.

According to another aspect of the present invention, there is provided a method determining entropy of a pixel of a real time streaming digital video image signal, for automatically detecting the nature of a video source, by identifying original mode of the real time streaming digital video image input signal, comprising the steps of: (a) receiving and characterizing the streaming digital video image input signal during a pre-determined time interval; (b) assigning and characterizing a local neighborhood of neighboring pixels to each input image pixel of the streaming digital video image input signal, in a temporal interlaced sequence of three consecutive fields in a global input grid of pixels included in the streaming digital video input image signal, the three consecutive fields being a previous field, a next field, and a current field; and (c) determining the entropy of each virtual pixel, of each previous pixel, and of each next pixel, in the temporal interlaced sequence of the three consecutive fields, relative to the assigned and characterized local neighborhoods of the neighboring pixels, the determining comprising the steps of: (i) calculating values of pixel inter-local neighborhood parameters for each previous pixel in the previous field, and for each next pixel in the next field, whereby each value of each pixel inter-local neighborhood parameter represents a regional sum of inter-local neighborhood weighted distances measured between the neighboring pixels located in subsets of the assigned and characterized local neighborhood of each virtual pixel in the current field, and the assigned and characterized local neighborhood of each previous pixel in the previous field, and of each next pixel, in the next field, respectively; (ii) calculating a value of a virtual-pixel intra-local neighborhood parameter, for each virtual pixel in the current field; (iii) adjusting a value of a pixel entropy counter for each previous pixel in the previous field, for each next pixel in the next field, and for each virtual pixel in the current field; (iv) calculating a value of the entropy of each previous pixel in the previous field, of each next pixel in the next field, and of each virtual pixel in the current field, from the values of the pixel entropy counters of the pixels; (d) defining and adjusting a value of fluctuation of the value of the entropy of each virtual pixel in the current field in the global input grid of the pixels included in the streaming digital video input image signal, thereby further characterizing the value of the entropy of each virtual pixel in the current field; and (e) assigning a real value to each virtual pixel in the current field in the global input grid of the pixels in the streaming digital video input image signal, whereby the real values of the virtual pixels in the streaming digital video input image signal correspond to identification of the original mode of the real time streaming digital video image input signal.

According to another aspect of the present invention, there is provided a method determining entropy of a pixel of a real time streaming digital video image signal, for automatically correcting an error produced during real time editing of the real time streaming digital video image input signal, comprising the steps of: (a) receiving and characterizing the streaming digital video image input signal during a pre-determined time interval; (b) assigning and characterizing a local neighborhood of neighboring pixels to each input image pixel of the streaming digital video image input signal, in a temporal interlaced sequence of three consecutive fields in a global input grid of pixels included in the streaming digital video input image signal, the three consecutive fields being a previous field, a next field, and a current field; and (c) determining the entropy of each virtual pixel, of each previous pixel, and of each next pixel, in the temporal interlaced sequence of the three consecutive fields, relative to the assigned and characterized local neighborhoods of the neighboring pixels, the determining comprising the steps of: (i) calculating values of pixel inter-local neighborhood parameters for each previous pixel in the previous field, and for each next pixel in the next field, whereby each value of each pixel inter-local neighborhood parameter represents a regional sum of inter-local neighborhood weighted distances measured between the neighboring pixels located in subsets of the assigned and characterized local neighborhood of each virtual pixel in the current field, and the assigned and characterized local neighborhood of each previous pixel in the previous field, and of each next pixel, in the next field, respectively; (ii) calculating a value of a virtual-pixel intra-local neighborhood parameter, for each virtual pixel in the current field; (iii) adjusting a value of a pixel entropy counter for each previous pixel in the previous field, for each next pixel in the next field, and for each virtual pixel in the current field; and (iv) calculating a value of the entropy of each previous pixel in the previous field, of each next pixel in the next field, and of each virtual pixel in the current field, from the values of the pixel entropy counters of the pixels, whereby the values of the entropy of each previous pixel in the previous field, of each next pixel in the next field, and of each virtual pixel in the current field, in the streaming digital video input image signal are used for automatically deciding, by performing sequences of mathematical logical operations, not to use values selected from the group consisting of value of a previous pixel in the previous field, and value of a next pixel in the next field, for assigning a real value to the virtual pixel in the current field in the global input grid of pixels featured in the streaming digital video input image signal, thereby correcting an error produced during real time editing of the streaming digital video image input signal.

Implementation of the method of the present invention involves performing or completing selected tasks or steps manually, semi-automatically, fully automatically, and/or, a combination thereof. Moreover, according to actual instrumentation and/or equipment used for implementing a particular preferred embodiment of the disclosed method, several selected steps of the present invention could be performed by hardware, by software on any operating system of any firmware, or a combination thereof. In particular, as hardware, selected steps of the invention could be performed by a computerized network, a computer, a computer chip, an electronic circuit, hard-wired circuitry, or a combination thereof, involving a plurality of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system.

BRIEF DESCRIPTION OF THE DRAWINGS

The accompanying drawing illustrates one or more implementations consistent with the principles of the invention and, together with the description, explain such implementations. In the drawing.

DESCRIPTION OF THE PREFERRED EMBODIMENTS

Figure 1:
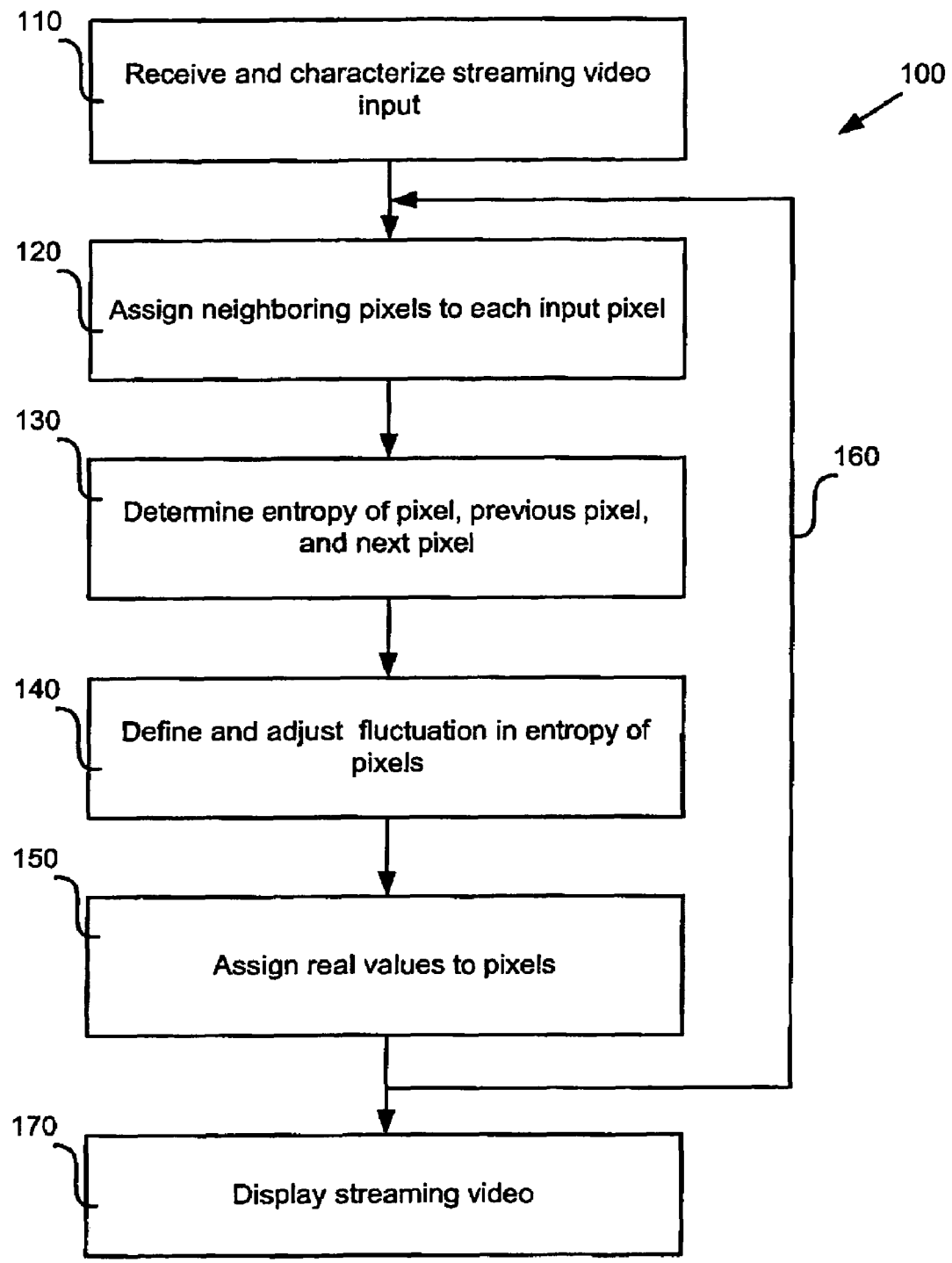
FIG. 1 illustrates an exemplary process of determining entropy of a pixel of a real time streaming digital video image signal.

The present invention relates to a method for determining entropy of a pixel of a real time streaming digital video image signal. The method of the present invention is particularly applicable for identifying the origin of, and processing, in real time, pixels of interlaced, non-interlaced, or de-interlaced, streaming digital video image signals, and for correcting errors produced during editing of streaming digital video image signals.

A main aspect of novelty and inventiveness of the method of the present invention is based upon determining the degree or extent of randomness or disorder, herein, referred to as the entropy, and determining the fluctuation thereof, herein, referred to as the entropy fluctuation, of each pixel relative to inter-local neighborhoods and intra-local neighborhoods of pluralities of selected pixels originating from the streaming digital video image signal. This fundamental aspect of 'pixel entropy', for characterizing the degree or extent of randomness or disorder, and fluctuation thereof, of a single pixel based on its surrounding local neighborhood, of a streaming digital video image signal, enables one to efficiently determine appropriate further processing of the pixels of the streaming digital video image signal. The method features a sequence of unique and inventive steps and sub-steps for determining the entropy, and fluctuation thereof, of each individual pixel of a plurality of pixels of a streaming digital video image signal.

The method of the present invention for analyzing and processing fields of pixels of a streaming digital video image signal, in general, and for determining entropy of a pixel of a real time streaming digital video image signal, in particular, (1) is independent of the type of the mode conversion used for generating the original streaming digital video image input signal, for example, a 3:2 or 2:2 pull down mode conversion method for converting film movies appropriate for a DVD disk player operating with a video NTSC or PAL format, and (2) is not based upon known methods or techniques involving 'a priori' pattern recognition based upon known methods or techniques involving evaluation of sets of 'accumulated' or 'summed' differences, instead of 'individual' differences, of pixel values located in successive fields of the streaming digital video image signal.

Based upon the above indicated main aspect of novelty and inventiveness, and advantages, the present invention successfully widens the scope of presently known techniques and methods in the electronics industry, in the field of processing and analyzing streaming digital video image signals which are applicable for identifying the original mode of streaming digital video image signals and correcting errors produced during editing of the streaming digital video image signals. Moreover, the present invention is readily commerically applicable.

It is to be understood that the invention is not limited in its application to the details of the order or sequence of steps of operation or implementation, set forth in the following description. For example, the following description refers to two commonly used non-interlaced film or progressive video to interlaced video scan rate conversions, a 3:2 pull down scan rate conversion and a 2:2 pull down scan rate conversion, in order to illustrate implementation of the present invention. The invention is capable of other embodiments or of being practiced or carried out in various ways, such as by applying different types of non-interlaced film or progressive video to interlaced video scan rate conversions. Also, it is to be understood that the phraseology and terminology employed herein are for the purpose of description and should not be regarded as limiting.

It is also to be understood that unless otherwise defined, all technical and scientific words, terms, and/or phrases, used herein have the same meaning as commonly understood by one of ordinary skill in the art to which this invention belongs. Phraseology, terminology, and, notation, employed herein are for the purpose of description and should not be regarded as limiting.

Steps and implementation of a method for determining entropy of a pixel of a real time streaming digital video image signal, particularly applicable for identifying the origin of, and processing, pixels of interlaced, non-interlaced, or de-interlaced, streaming digital video image signals such as film mode video signals or progressive video signals or computer animation video signals, and for correcting errors produced during editing of streaming digital video image signals, according to the present invention are better understood with reference to the following description.

As previously stated above, currently, regular video broadcasting by systems using NTSA, PAL, or, SECAM, types of standard formats, often incorporates a mixing of video image signals acquired by more than one type of video camera source, such as various combinations of interlaced video, non-interlaced or progressive video, non-interlaced Hollywood movie film, and, non-interlaced computer graphics, camera sources. If the camera source acquires image signals according to a non-interlaced or progressive type format and the broadcasting is of an interlaced type format, image signals acquired by the non-interlaced or progressive camera source need to be converted into an interlaced type format. Alternatively, if the broadcasting is of a non-interlaced or progressive type format, such as an HDTV progressive type format, and the digital video image signal display is of an interlaced type format, here, the broadcast video image signals need to be converted into an interlaced type format for proper display.

In order to better understand implementation of the method of the present invention, two commonly used procedures for scan rate conversion of non-interlaced film or progressive video formats into interlaced formats of broadcasting video are described herein. The type of scan rate conversion usually involves two main parameters: (1) the number of input frames, and, (2) the number of output fields, that is, the type of interlaced video format, for example, NTSC, PAL, or, SECAM. The first commonly used scan rate conversion is the 3:2 pull down conversion, for converting 24/25 input frames per second of non-interlaced film source into 60 fields per second of NTSC interlaced video format. The second commonly used scan rate conversion is the 2:2 pull down conversion, for converting 24/25 input frames per second of non-interlaced film source into 50 fields per second of PAL interlaced video format. The method of the present invention is suitable to other types of scan rate conversions of non-interlaced film or progressive video formats to interlaced video formats.

In the 3:2 pull down scan rate conversion, non-interlaced film of 24 frames is converted to NTSC interlaced video format as follows. Each sequential odd (or, even) frame is converted into three fields of even, odd, and even, fields, where the even fields feature the same even lines of the original frame and the odd field features the same odd lines of the original frame. Each sequential even frame is converted into two fields, where the even field features the even lines of the original frame and the odd field features the odd lines of the original frame, thus, producing 60 fields per second (60 Hz).

In the 2:2 pull down scan rate conversion, non-interlaced film of 24 frames per second is converted to 50 fields per second of PAL interlaced video format as follows. In case (a), each sequential frame is converted into two fields, an odd and an even field, where the odd field features the odd horizontal lines of the original frame and the even field features the even horizontal lines of the original frame, thus, generating 48 fields per second (48 Hz) instead of 50 fields per second (50 Hz). In case (b), each sequential frame is converted into two fields as described above for case (a), except that sequential frames of order k*12, for k=1, 2, 3, 4, . . . , in the film sequence are converted into three fields in the same manner as for the 3:2 pull down conversion, thus, generating 50 fields per second (50 Hz). In case (c), if the film is of 25 frames per second, then the conversion is performed according to case (a), thus, generating 50 fields per second (50 Hz).

FIG. 1 illustrates an exemplary process 100 of determining entropy of a pixel of a real time streaming digital video image signal. In Step (a) (act 110) of the method for determining entropy of a pixel of a real time streaming digital video image signal, of the present invention, there is receiving and characterizing the streaming digital video image input signal during a pre-determined time interval.

More specifically, there is receiving a streaming digital video input image signal, I, during a pre-determined time interval, herein, generally referred to as $\Delta t$, featuring a plurality of input image signal pixels, I(i,j), which can be plotted in a global input grid of a digital video image signal processing device, whose position coordinates in the global input grid are indicated by horizontal line (row) i, and vertical column j. For the streaming digital video input image signal, I, of size R horizontal lines (rows) by C vertical columns, position indices (i,j) are preferably limited to the size of the streaming digital video input image signal, I, as follows: i: 0, 1, 2, . . . R−1; and j: 0, 1, 2, . . . C−1. In general, indices i and j are real or integer.

Implementation of the method of the present invention is 'independent' of the type of the mode conversion used for generating the streaming digital video image input signal. For example, a 3:2, 2:2, or other, pull down mode conversion method for converting film movies appropriate for a DVD disk player operating with a video NTSC or PAL format, is used for providing the streaming digital video image input signal, I, in the method of the present invention.

In Step (b) (act 120), there is assigning and characterizing a local neighborhood of neighboring pixels to each input image pixel, I (i,j), of the streaming digital video image input signal, in a temporal interiaced sequence of three consecutive fields, in the global input grid of pixels featured in the streaming digital video input image signal, I.

The streaming digital video input image signal, I, consists of a continuous sequence of fields, F, where each field contains half of the entire number of horizontal lines of an image frame as displayed on a TV screen. Accordingly, such a sequence is an interlaced sequence, where each field in the sequence contains either odd or even horizontal lines. There is defining F(t−1), F(t), and F(t+1), as a temporal interlaced sequence of three consecutive fields of the digital video input image signal, where F(t−1) represents a previous field, F(t) represents a current field, and F(t+1) represents a next field, in the temporal interlaced sequence of fields.

In sub-step (i) of Step (b), there is assigning a first local neighborhood of neighboring pixels to each missing or 'virtual' pixel, V(i,j), hereinafter, referred to as virtual pixel, V(i,j), within a missing horizontal line of the current field, F(t), in the global input grid of pixels featured in the streaming digital video input image signal, I.

V(i,j) represents the value of a virtual pixel at time (t) having position coordinates of horizontal line i and vertical column j in the current field, F(t). The first local neighborhood assigned to each virtual pixel, V(i,j), consists of (2L)(2M+1) neighboring pixels, where L>0 and M≧0 are positive integers. (L)(2M+1) neighboring pixels are located in horizontal lines i−1, i−2, . . . , i−L, and (L)(2M+1) neighboring pixels are located in horizontal lines i+1, i+2, . . . , i+L, in the current field F(t), where horizontal line i of the current field, F(t), is missing due to the interlace format.

In sub-step (ii) of Step (b), there is assigning a second local neighborhood of neighboring pixels to each pixel located in the previous field, F(t−1), and to each pixel located in the next field, F(t+1), in the global input grid of pixels featured in the streaming digital video input image signal, I. The second local neighborhood assigned to each pixel located in horizontal lines i−K, . . . , i, . . . , i+K, in the previous field, F(t−1), and to each pixel located in the next field, F(t+1), consists of (2K+1)(2M+1) neighboring pixels, where K is a positive integer greater than zero, that is, 1, 2, 3, . . . .

Additionally, or alternatively, pixels located in previous horizontal lines and/or next horizontal lines relative to pixel P(i,j) and/or relative to pixel N(i,j) may be selected for assigning the second local neighborhood of pixels to each pixel, P(i,j) and/or to each pixel N(i,j), located in the temporal interlaced sequence of the three consecutive fields, F(t−1), F(t), and F(t+1), in the global input grid of pixels featured in the streaming digital video input image signal, I.

In sub-step (iii) of Step (b), there is selecting a previous pixel, P(i,j), and a next pixel, N(i,j), as two sequential pixels in the previous field, F(t−1), and in the next field, F(t+1), respectively. P(i,j) represents the value of the previous pixel at time (t−1) having position coordinates of horizontal line i and vertical column j in the previous field, F(t−1), and N(i,j) represents the value of the next pixel at time (t+1) having position coordinates of horizontal line i and vertical column j, located at the same position coordinates (i,j) as the previous pixel, P(i,j), in the next field, F(t+1).

In Step (c) (act 130) there is determining the entropy of each virtual pixel, V(i,j), each previous pixel, P(ij), and each next pixel, N(ij), in the temporal interlaced sequence of the three consecutive fields, F(t−1), F(t), and F(t+1), relative to the assigned and characterized first and second local neighborhoods of neighboring pixels located in the temporal interlaced sequence of the three consecutive fields, F(t−1), F(t), and F(t+1), in the global input grid, as defined in preceding Step (b), of pixels featured in the streaming digital video input image signal, I.

As previously stated above, the main aspect of novelty and inventiveness of the present invention is based upon determining the degree of randomness or disorder, or entropy, and determining the entropy fluctuation, of each pixel relative to inter-local neighborhoods and intra-local neighborhoods of pluralities of selected pixels originating from the streaming digital video image signal. This fundamental aspect of 'pixel entropy', for characterizing the degree or extent of randomness or disorder, and fluctuation thereof, of a single pixel based on its surrounding local neighborhood, of a streaming digital video image signal, enables one to efficiently determine appropriate further processing of the pixels of the streaming digital video image signal.

Accordingly, in the present invention, there is determining the degree of randomness or disorder, or the entropy, and determining the entropy fluctuation, of each pixel, that is, each virtual pixel, V(i,j), each previous pixel, P(i,j), and each next pixel, N(i,j), relative to the above assigned and characterized first and second local neighborhoods of pixels located in the temporal interlaced sequence of the three consecutive fields, F(t−1), F(t), and F(t+1), of the global input grid of pixels featured in the streaming digital video input image signal, I.

In sub-step (i) of Step (c), there is calculating values of pixel inter-local neighborhood parameters for each previous pixel, P(i,j), in the previous field, F(t−1), and for each next pixel, N(i,j), in the next field, F(t+1). The value of each pixel inter-local neighborhood parameter represents a regional sum of inter-local neighborhood weighted distances measured between neighboring pixels located in subsets of the assigned and characterized first local neighborhood of each virtual pixel, V(i,j), in the current field, F(t), and the assigned and characterized second local neighborhood, of each previous pixel, P(i,j), in the previous field, F(t−1), and of each next pixel, N(i,j), in the next field, F(t+1), of Step (b), respectively.

In sub-step (1) of sub-step (i), there is calculating values of two previous-pixel inter-local neighborhood parameters, herein, referred to as first previous-pixel inter-local neighborhood parameter, P1, and second previous-pixel inter-local neighborhood parameter, P2, for each previous pixel, P(i,j), in the previous field, F(t−1). The value of each previous-pixel inter-local neighborhood parameter, P1 and P2, represents a regional sum of inter-local neighborhood weighted distances measured between pixels located in subsets of the first local neighborhood of each virtual pixel, V(i,j), consisting of (2L)(2M+1) neighboring pixels, and the second local neighborhood of each previous pixel, P(i,j), consisting of (2K+1)(2M+1) neighboring pixels.

First previous-pixel inter-local neighborhood parameter, P1, represents a regional sum of inter-local neighborhood weighted distances measured between subsets of the first local neighborhood of each virtual pixel, V(i,j), having (2L)(2M+1) neighboring pixels located in horizontal lines i−L, . . . , i−1, i+1, . . . , i+L, in the current field, F(t), and of the second local neighborhood of each previous pixel, P(i,j), having (2K+1)(2M+1) neighboring pixels located in horizontal lines i−K, . . . , i−2, i−1, i, i+1, i+2, . . . , i+K, in the previous field, F(t−1).

A particular case is where K=L−1 and L=1. Thus, the second local neighborhood of previous pixel, P(i,j), contains only horizontal line i and 2M+1 neighboring pixels located in the horizontal line i. Accordingly, in this case, the regional sum of inter-local neighborhood weighted distances, P1, is calculated between subsets of the first local neighborhood of each virtual pixel, V(i,j), having (2)(2M+1) neighboring pixels located in horizontal line i−1 in the current field, F(t), and of the second local neighborhood of each previous pixel, P(i,j), having (2M+1) neighboring pixels located in horizontal line i in the previous field, F(t−1). Thus, the regional sum of inter-local neighborhood weighted distances, P1, is determined from the sum of the weighted distances measured between each virtual pixel, V(i,j), located in the horizontal line i−1 in the current field, F(t), and each corresponding previous pixel, P(i,j), located in the horizontal line i in the previous field, F(t−1).

Second previous-pixel inter-local neighborhood parameter, P2, represents a regional sum of inter-local neighborhood weighted distances measured between additional subsets of the first local neighborhood of each virtual pixel, V(i,j), having the (2L)(2M+1) neighboring pixels located in horizontal lines i−L, . . . , i−1, i+1, . . . , i+L, in the current field, F(t), and of the second local neighborhood of each previous pixel, P(i,j), having the (2K+1)(2M+1) neighboring pixels located in horizontal lines i−K, . . . , i−2, i−1, i, i+1, i+2, . . . , i+K, in the previous field, F(t−1).

In sub-step (2) of sub-step (i), there is calculating values of two next-pixel inter-local neighborhood parameters, herein, referred to as first next-pixel inter-local neighborhood parameter, N1, and second next-pixel inter-local neighborhood parameter, N2, for each next pixel, N(i,j), in the next field, F(t+1). The value of each next-pixel inter-local neighborhood parameter, N1 and N2, represents a regional sum of inter-local neighborhood weighted distances measured between pixels located in subsets of the first local neighborhood of each virtual pixel, V(i,j), consisting of (2L)(2M+1) neighboring pixels, and the second local neighborhood of each next pixel, N(i,j), consisting of (2K+1) (2M+1) neighboring pixels.

First next-pixel inter-local neighborhood parameter, N1, represents a regional sum of inter-local neighborhood weighted distances measured between subsets of the first local neighborhood of each virtual pixel, V(i,j), having the (2L)(2M+1) neighboring pixels located in horizontal lines i−L, . . . , i−1, i+1, . . . , i+L, in the current field, F(t), and of the second local neighborhood of each next pixel, N(i,j), having the (2K+1)(2M+1) neighboring pixels located in horizontal lines i−K, . . . , i−2, i−1, i, i+1, i+2, . . . , i+K, in the next field, F(t−1).

A particular case is where K=L−1 and L=1. Thus, the second local neighborhood of next pixel, N(i,j), contains only horizontal line i and 2M+1 neighboring pixels located in the horizontal line i. Accordingly, in this case, the regional sum of inter-local neighborhood weighted distances, N1, is calculated between subsets of the first local neighborhood of each virtual pixel, V(i,j), having (2)(2M+1) neighboring pixels located in horizontal line i−1 in the current field, F(t), and of the second local neighborhood of each next pixel, N(i,j), having (2M+1) neighboring pixels located in horizontal line i in the next field, F(t+1). Thus, the regional sum of inter-local neighborhood weighted distances, N1, is determined from the sum of the weighted distances measured between each virtual pixel, V(i,j), located in the horizontal line i−1 in the current field, F(t), and each corresponding next pixel, N(i,j), located in the horizontal line i in the next field, F(t+1).

Second next-pixel inter-local neighborhood parameter, N2, represents a regional sum of inter-local neighborhood weighted distances measured between additional subsets of the first local neighborhood of each virtual pixel, V(i,j), having (2L)(2M+1) neighboring pixels located in horizontal lines i−L, . . . , i−1, i+1, . . . , i+L, in the current field, F(t), and of the second local neighborhood of each next pixel, N(i,j), having (2K+1)(2M+1) neighboring pixels located in horizontal lines i−K, . . . , i−2, i−1, i, i+1, i+2, . . . , i+K, in the next field, F(t+1).

In sub-step (ii) of Step (c), there is calculating a value of a virtual-pixel intra-local neighborhood parameter, herein, referred to as virtual-pixel intra-local neighborhood parameter, VIRT, for each virtual pixel, V(i,j), in the current field, F(t). The value of the virtual-pixel intra-local neighborhood parameter, VIRT, represents a regional sum of the intra-local neighborhood weighted distances measured between pixels located in horizontal lines i−1, i−2, . . . , i−L, of the first local neighborhood of each virtual pixel, V(i,j), consisting of (L)(2M+1) neighboring pixels, and pixels located in horizontal lines i+1, i+1, i+2, . . . , i+L, within the same first local neighborhood of the same virtual pixel, V(i,j), consisting of (L)(2M+1) neighboring pixels, where L is a positive integer greater than zero, that is, 1,2,3, . . . .

In sub-step (iii) of Step (c), there is adjusting a value of a pixel entropy counter for each of the previous pixel, P(i,j), in the previous field, F(t−1), the next pixel, N(i,j), in the next field, F(t+1), and the virtual pixel, V(i,j), in the current field, F(t).

The value of each entropy counter is adjusted according to the results obtained by performing the following mathematical logical operations on values of the pixel local neighborhood parameters, that is, first and second previous-pixel inter-local neighborhood parameters, P1 and P2, respectively, first and second next-pixel inter-local neighborhood parameters, N1 and N2, respectively, and virtual-pixel inter-local neighborhood parameter, VIRT, previously defined and calculated according to preceding sub-steps (i) and (ii) of Step (c).

(1) If the maximum value, Pmax, between P1 and P2, is greater than the maximum value, Nmax, between N1 and N2, and is greater than the value of VIRT, then the value of the first previous-pixel entropy counter, P1-entropy counter, is increased by 1.

(2) If the minimum value, Pmin, between P1 and P2, is lower than the minimum value, Nmin, between N1 and N2, and is lower than the value of VIRT, then the value of the second previous-pixel entropy counter, P2-entropy counter, is increased by 1.

(3) If the maximum value, Nmax, between N1 and N2, is greater than the maximum value, Pmax, between P1 and P2, and is greater than the value of VIRT, then the value of the first next-pixel entropy counter, N1-entropy counter, is increased by 1.

(4) If the minimum value, Nmin, between N1 and N2, is lower than the minimum value, Pmin, between P1 and P2, and is lower than the value of VIRT, then the value of the second next-pixel entropy counter, N2-entropy counter, is increased by 1.

(5) If the value of VIRT is greater than the maximum value, Nmax, and greater than the maximum value, Pmax, then the value of the first virtual-pixel entropy counter, VIRT1-entropy counter, is increased by 1.

(6) If the value of VIRT is lower than the minimum value, Nmin, and lower than the minimum value, Pmin, then the value of the second virtual-pixel entropy counter, VIRT2-entropy counter, is increased by 1.

In sub-step (iv) of Step (c), there is calculating a value of the entropy of each previous pixel, P(i,j), in the previous field, F(t−1), of each next pixel, N(i,j), in the next field, F(t+1), and of each virtual pixel, V(i,j), in the current field, F(t), and determining relative relationships among the entropy values, by using the values of the pixel entropy counters of preceding sub-step (iii) of Step (c).

This sub-step is performed according to the following sequence of mathematical logical operations performed on values of the pixel entropy counters, that is, first and second previous-pixel entropy counters, P1-entropy counter and P2-entropy counter, respectively, first and second next-pixel entropy counters, N1-entropy counter and N2-entropy counter, respectively, and virtual-pixel entropy counter, VIRT-entropy counter, previously defined and calculated according to preceding sub-step (iii) of Step (c).

(1) Initialization: set P-entropy counter=0, N-entropy counter=0, and VIRT-entropy counter=0, according to external set, that is, initialization is for every single pixel, or up to semi field, or entire field, or up to several sequential fields.

(2) Set:

$P12=p1*(P1\text{-entropy counter})+p2*(P2\text{-entropy counter})$, $N12=n1*(N1\text{-entropy counter})+n2*(N2\text{-entropy counter})$, and $VIRT12=v1*(VIRT1\text{-entropy counter})+v2*(VIRT2\text{-entropy counter})$, where p1, p2, n1, n2, v1, v2, are all real positive constants, and the asterisk, *, represents the multiplication operation.

(3) Then:
(I) if P12 is greater than N12 and greater than VIRT12, or if the two variable entropy function, E(x, y), of the two positive variables x and y, where x and y correspond to functions, and are expressed in terms, of the pixel entropy counters, which has an exemplary form as $E(x, y)=(1+x)*\log[1/(1+y)]$, or has an exemplary form as $E(x, y)=(1+x)/(1+y)$, such that the value of the entropy function, $E(P12, N12)=(1+P12)/(1+N12)$ is greater than the value of the entropy function $E(VIRT12, P12)=(1+VIRT12)/(1+P12)$, then the value of the entropy of the previous pixel, P(i,j), is less than the value of the entropy of the next pixel, N(i,j), and less than the value of the entropy of the virtual pixel, V(i,j).

(II) if N12 is greater than P12 and greater than VIRT12, or if the two variable entropy function, E(x, y), of the two positive variables x and y, which has an exemplary form as $E(x, y)=(1+x)*\log[1/(1+y)]$, or has an exemplary form as $E(x, y)=(1+x)/(1+y)$, such that the value of the entropy function $E(N12, P12)=(1+N12)/(1+P12)$ is greater than the value of the entropy function $E(VIRT12, N12)=(1+VIRT12)/(1+N12)$, then the value of the entropy of the next pixel, N(i,j), is less than the value of the entropy of the previous pixel, P(i,j), and less than the value of the entropy of the virtual pixel, V(i,j).

(III) if VIRT12 is greater than P12 and greater than N12, then the value of the entropy of the virtual pixel, V(i,j), is less than the value of the entropy of the previous pixel, P(i,j), and less than the value of the entropy of the next pixel, N(i,j).

(IV) if none of the above can be determined, then the value of the entropy of the virtual pixel, V(i,j), the value of the previous pixel, P(i,j), and the value of the next pixel, N(i,j), are all equal.

Completion of Step (c) results in obtaining values of the entropy and determining relative relationships among the values of the entropy of each previous pixel, P(i,j), in the previous field, F(t−1), each next pixel, N(i,j), in the next field, F(t+1), and each virtual pixel, V(i,j), in the current field, F(t), in the global input grid, as defined in preceding Step (b), of pixels featured in the streaming digital video input image signal, I.

A main application of the method of the present invention is for automatically detecting the nature of a video source, that is, by identifying the original mode of the real time streaming digital video image input signal (film movie, video camera, graphics, and a combination thereof). Implementation of the present invention (1) is independent of the type of the mode conversion used for generating the original streaming digital video image input signal, for example, a 3:2 or 2:2 pull down mode conversion method for converting film movies appropriate for a DVD disk player operating with a video NTSC or PAL format, and (2) is not based upon known methods or techniques involving 'a priori' pattern recognition based upon known methods or techniques involving evaluation of sets of 'accumulated' or 'summed' differences, instead of 'individual' differences, of pixel values located in successive fields of the streaming digital video image signal.

Another very useful application of the method of the present invention is for correcting errors produced during real time editing of the streaming digital video image input signal. In particular, if the video source is of film mode and contains various sections of bad edit, that is, bad editing occurs whenever two non-continuous or partially continuous film scenes are attached or glued together for forming a glued video sequence, whereby at a certain point in time the glued video sequence does not match the original sequence. Such an artifact is called bad edit which generates fractions in lines and pixels in the glued video sequence of the streaming digital video images signal.

For correcting errors produced during editing of the streaming digital video image input signal, the method of the present invention is implemented for automatically deciding, by performing sequences of mathematical logical operations, not to use values of the previous pixel, P(i,j), in the previous field, F(t−1), or of the next pixel, N(i,j), in the next field, F(t+1), for assigning a real value to the virtual pixel, V(i,j), in the current field, F(t), in the global input grid of pixels featured in the streaming digital video input image signal, I.

The method of the present invention additionally includes the following steps, Steps (d)-(e), specifically directed toward the just described image processing applications of mode detection and correcting editing errors.

In order to further characterize the value of the entropy of the virtual pixel, V(i,j), in the current field, F(t), for determining different ways of performing local interpolation on the pixels, the method of the present invention additionally includes the following step, Step (d), for adjusting a value of the fluctuation of the entropy of the virtual pixel, V(i,j), herein, referred to as virtual-pixel entropy fluctuation, VIRT-entropy fluctuation.

In Step (d) (act 140), there is defining and adjusting a value of fluctuation of the value of the entropy of each virtual pixel, V(ij), in the current field, F(t), in the global input grid of pixels featured in the streaming digital video input image signal, I. The following two sub-steps are performed for adjusting the fluctuation of the value of the entropy of the virtual pixel, V(i,j), herein, defined and referred to as virtual-pixel entropy fluctuation, VIRT-entropy fluctuation.

In sub-step (i) of Step (d), there is initializing and setting the value of the virtual-pixel entropy fluctuation, VIRT-entropy fluctuation, equal to zero, for each virtual pixel, V(i,j), in the current field, F(t).

In sub-step (ii) of Step (d), there is increasing the value of the virtual-pixel entropy fluctuation, VIRT-entropy fluctuation, by 1 if there is a change in slope between sequential pairs of neighboring pixels in the virtual pixel local neighborhood, that is, in the first local neighborhood of neighboring pixels to each virtual pixel, V(i,j), as previously defined and characterized in sub-step (i) of Step (b), above. For example, the value of the virtual-pixel entropy fluctuation, VIRT-entropy fluctuation, of a virtual pixel, V(i,j), located in the first local neighborhood of V(i,j), in the horizontal line i−1 containing 5 pixels, whereby L=0, M=4, and (2M+1)=5, with pixel values of (120 50 200 30 20), is equal to 2, since the slope changes twice.

In Step (e) (act 150), there is assigning a real value to the virtual pixel, V(i,j), in the current field, F(t), in the global input grid of pixels featured in the streaming digital video input image signal, I.

The real value of the virtual pixel, V(i,j), is assigned according to the following mathematical logical operations performed on values of the entropy of each of the previous pixel, P(i,j), in the previous field, F(t−1); the next pixel, N(i,j), in the next field, F(t+1); and the virtual pixel, V(i,j), in the current field, F(t), which were calculated according to preceding sub-step (iv) of Step (c).

(i) If the previous pixel, P(i,j), has the lowest or minimal value of the entropy, as defined and calculated in (I) of sub-step (iv) of Step (c), then the virtual pixel, V(i,j), in the current field, F(t), is assigned the real value of the previous pixel, P(i,j).

(ii) If the next pixel, N(i,j) has the lowest or minimal value of the entropy, as defined and calculated in (II) of sub-step (iv) of Step (c), then the virtual pixel, V(i,j), in the current field, F(t), is assigned the real value of the next pixel, N(i,j).

(iii) If the virtual pixel, V(i,j), has the lowest or minimal value of the entropy, as defined and calculated in (III) of sub-step (iv) of Step (c), then the virtual pixel, V(i,j), is assigned the real value according to the value of the virtual-pixel entropy fluctuation, VIRT-entropy fluctuation, as follows:

(1) If the value of the virtual-pixel entropy fluctuation, VIRT-entropy fluctuation, is greater or equal to a positive threshold value, herein referred to as Q, then the real value of the virtual pixel, V(i,j), is determined by using a procedure of spline interpolation, such as a bilinear spline (B-spline) interpolation procedure, or a cubic spline (C-spline) interpolation procedure. Spline interpolation procedures are readily known in the art of numerical methods and analysis, in general, and in the art of numerical interpolation, in particular, for example, as described in "Theory and Applications of Numerical Analysis", G. M. Philips and P. J. Taylor, Academic Press, 1973.

(2) If the value of the virtual-pixel entropy fluctuation, VIRT-entropy fluctuation, is between two arbitrary positive integers, herein, referred to as Ua and Ub, where Ua<Ub<Q, then the real value of the virtual pixel, V(i,j), is determined by using a local directional interpolation technique, such as that disclosed in U.S. Pat. No. 6,239,842, entitled "Method Of De-interlacing Interlaced Video Formats Using A Mixed Mode Spatial And Temporal Approximation Technique", by the same inventor as the present invention, for generating an adaptive approximation.

Directional interpolation refers to interpolation performed along vertical, horizontal, or diagonal, edges or singular lines, where, with respect to implementing the method of the present invention, edge is defined as a continuous collection of singular points characterizing and distinguishing the nature or mode of a streaming digital video image. For example, caricature lines define continuous singular points, and as consequence, characterize and distinguish the nature of the streaming digital video image. Edge or singular line is a well known concept in the field of image processing, for example, as described in the textbook "Fundamental of Digital Image Processing", Anil K. Jain, Prentice Hall, 1989.

Regarding this step in the method of the present invention, the value of the virtual-pixel entropy fluctuation, VIRT-entropy fluctuation, determines the type, that is, directional or non-directional, of the interpolation used for assigning a real value to the virtual pixel, V(i,j), from the surrounding local neighborhood of the virtual pixel, V(i,j).

(iv) In the case where value of the virtual-pixel entropy fluctuation, VIRT-entropy fluctuation, pixel entropy cannot be determined by any of (I), (II), or (III), of sub-step (iv) of Step (c), then the real value of the virtual pixel, V(i,j), the value of the previous pixel, P(i,j), and the value of the next pixel, N(i,j), are all equal.

In Step (f) (act 160), there is repeating Steps (b) through (e) (acts 120-150, for a pre-determined plurality of additional temporal interlaced sequences of three consecutive fields, in the global input grid of frames featured in the streaming digital video input image signal, I, for generating a streaming digital video output image signal, O, featuring complete frames of fields of a plurality of output image signal pixels, O(k,l), which can be plotted in a global output grid of a digital video image signal processing device, whose position coordinates in the global output grid are indicated by horizontal line (row) k, and vertical column l.

In Step (g) (act 170), there is displaying the streaming digital video output image signal, O, of Step (f), on a display of a digital video image display device.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for determining entropy of a pixel of a real time streaming digital video image signal to identify the origin of, and process, in real time, pixels of interlaced, non-interlaced, or de-interlaced, streaming digital video image signals, comprising the steps of:

(a) receiving and characterizing the streaming digital video image input signal during a pre-determined time interval;

(b) assigning and characterizing a local neighborhood of neighboring pixels to each input image pixel of the streaming digital video image input signal, in a temporal interlaced sequence of three consecutive fields in a global input grid of pixels included in the streaming digital video input image signal, said three consecutive fields being a previous field, a next field, and a current field; and (c) determining the entropy of each virtual pixel, of each previous pixel, and of each next pixel, in said temporal interlaced sequence of said three consecutive fields, relative to said assigned and characterized local neighborhoods of said neighboring pixels, said determining comprising the steps of:

(i) calculating values of pixel inter-local neighborhood parameters for each said previous pixel in said previous field, and for each said next pixel in said next field, whereby each said value of each said pixel inter-local neighborhood parameter represents a regional sum of inter-local neighborhood weighted distances measured between said neighboring pixels located in subsets of said assigned and characterized local neighborhood of each said virtual pixel in said current field, and said assigned and characterized local neighborhood of each said previous pixel in said previous field, and of each said next pixel, in said next field, respectively;

(ii) calculating a value of a virtual-pixel intra-local neighborhood parameter, for each said virtual pixel in said current field;

(iii) adjusting a value of a pixel entropy counter for each said previous pixel in said previous field, for each said next pixel in said next field, and for each said virtual pixel in said current field; and (iv) calculating a value of the entropy of each said previous pixel in said previous field, of each said next pixel in said next field, and of each said virtual pixel in said current field, from said values of said pixel entropy counters of said pixels.

2. The method of claim 1, whereby in step (a) the streaming digital video image input signal is received following subjecting the streaming digital video image input signal to a pull down mode conversion method selected from the group consisting of a 3:2 pull down mode conversion method, a 2:2 pull down mode conversion method, and a scan rate conversion, other than the 3:2 pull down mode conversion and the 2:2 pull down conversion, from a non-interlaced film format or a progressive video format to an interlaced video format.

3. The method of claim 1, whereby step (b) further comprises:

(i) assigning a first local neighborhood of said neighboring pixels to each said virtual pixel within a missing horizontal line of said current field.

4. The method of claim 3, whereby step (b) further comprises:

(ii) assigning a second local neighborhood of said neighboring pixels to each said pixel located in said previous field, and to each said pixel located in said next field.

5. The method of claim 4, whereby pixels located in horizontal lines of a field previous to said previous field are selected for said assigning said second local neighborhood to each said previous pixel located in said temporal interlaced sequence of said three consecutive fields.

6. The method of claim 4, whereby pixels located in horizontal lines of a field next to said next field are selected for said assigning said second local neighborhood to each said next pixel located in said temporal interlaced sequence of said three consecutive fields.

7. The method of claim 4, whereby step (b) further comprises:

(iii) selecting said previous pixel and said next pixel as two sequential pixels in said previous field and in said next field, respectively.

8. The method of claim 1, whereby step (i) of step (c) further comprises:

(1) calculating values of two previous-pixel inter-local neighborhood parameters for each said previous pixel in said previous field, said value of each said previous-pixel inter-local neighborhood parameter represents a regional sum of inter-local neighborhood weighted distances measured between said pixels located in subsets of a first local neighborhood of each said virtual pixel, and a second local neighborhood of each said previous pixel.

9. The method of claim 1, whereby step (i) of step (c) further comprises:

(2) calculating values of two next-pixel inter-local neighborhood parameters for each said next pixel in said next field, said value of each said next-pixel inter-local neighborhood parameter represents a regional sum of inter-local neighborhood weighted distances measured between said pixels located in subsets of a first local neighborhood of each said virtual pixel, and a second local neighborhood of each said next pixel.

10. The method of claim 1, whereby in step (ii) of step (c), said value of said virtual-pixel intra-local neighborhood parameter represents a regional sum of intra-local neighborhood weighted distances measured between said pixels located in horizontal lines of a first local neighborhood of each said virtual pixel, and said pixels located in different horizontal lines within same said first local neighborhood of same said virtual pixel.

11. The method of claim 1, whereby in step (iii) of step (c) said value of each said entropy counter is adjusted according to results obtained by performing mathematical logical operations on said values of said pixel local neighborhood parameters and on said values of said virtual-pixel inter-local neighborhood parameter.

12. The method of claim 1, whereby step (iv) of step (c) is performed according to a sequence of mathematical logical operations performed on said values of said pixel entropy counters of said previous pixel in said previous field, said next pixel in said next field, and of said virtual pixel in said current field.

13. The method of claim 1, whereby step (iv) of step (c) includes use of evaluating an entropy function expressed in terms of said pixel entropy counters of each said previous pixel in said previous field, of each said next pixel in said next field, and of each said virtual pixel in said current field.

14. The method of claim 1, whereby step (iv) of step (c) further includes determining relative relationships among said entropy values of said pixels, by using said values of said pixel entropy counters of said pixels.

15. The method of claim 1, further comprising the additional step of: (d) defining and adjusting a value of fluctuation of said value of the entropy of each said virtual pixel in said current field in said global input grid of said pixels included in the streaming digital video input image signal, thereby further characterizing said value of the entropy of each said virtual pixel in said current field.

16. The method of claim 15, further comprising the steps of: (i) initializing and setting said value of said fluctuation of said value of the entropy equal to zero, for each said virtual pixel in said current field; and (ii) increasing said value of said fluctuation of said value of the entropy if there is a change in slope between sequential pairs of said neighboring pixels in said local neighborhood of said virtual pixel.

17. The method of claim 15, further comprising the additional step of: (e) assigning a real value to each said virtual pixel in said current field in said global input grid of said pixels in the streaming digital video input image signal.

18. The method of claim 17, whereby said assigning is performed according to mathematical logical operations performed on said values of the entropy of said previous pixel in said previous field, said next pixel in said next field, and said virtual pixel in said current field.

19. The method of claim 17, whereby said real value assigned to a said virtual pixel in said current field is selected from the group consisting of real value of said previous pixel, and real value of said next pixel.

20. The method of claim 17, whereby said real value is assigned to a said virtual pixel in said current field according to a said value of fluctuation of said value of the entropy of said virtual pixel.

21. The method of claim 17, whereby said real value is assigned to a said virtual pixel in said current field according to a said value of fluctuation of said value of the entropy of said virtual pixel, by using a procedure of spline interpolation.

22. The method of claim 17, whereby said real value is assigned to a said virtual pixel in said current field according to a said value of fluctuation of said value of the entropy of said virtual pixel, by using a procedure of directional interpolation.

23. The method of claim 17, whereby said real value assigned to a said virtual pixel in said current field is equal to real value of said previous pixel and to real value of said next pixel.

24. The method of claim 17, further comprising the step of: (f) repeating steps (b) through (e) for a pre-determined plurality of additional said temporal interlaced sequences of three consecutive fields in said global input grid of frames featured in the streaming digital video input image signal, for generating a streaming digital video output image signal.

25. The method of claim 24, further comprising the step of: (g) displaying said streaming digital video output image signal on a display of a digital video image display device.

26. The method of claim 1, whereby said values of the entropy of each said previous pixel in said previous field, of each said next pixel in said next field, and of each said virtual pixel in said current field, in the streaming digital video input image signal are used for automatically detecting nature of a video source by identifying original mode of the real time streaming digital video image input signal.

27. The method of claim 26, whereby said original mode of the real time streaming digital video image input signal is selected from the group consisting of a film movie mode, a video camera mode, a graphics mode, and a combination of said film movie mode, said video camera mode, and said graphics mode.

28. The method of claim 1, whereby said values of the entropy of each said previous pixel in said previous field, of each said next pixel in said next field, and of each said virtual pixel in said current field, in the streaming digital video input image signal are used for correcting an error produced during real time editing of the streaming digital video image input signal.

29. The method of claim 1, whereby said values of the entropy of each said previous pixel in said previous field, of each said next pixel in said next field, and of each said virtual pixel in said current field, in the streaming digital video input image signal are used for automatically deciding, by performing sequences of mathematical logical operations, not to use values selected from the group consisting of value of a said previous pixel in said previous field, and value of a next pixel in said next field, for assigning a real value to said virtual pixel in said current field in said global input grid of pixels featured in the streaming digital video input image signal, thereby correcting an error produced during real time editing of the streaming digital video image input signal.

30. A method determining entropy of a pixel of a real time streaming digital video image signal, for automatically detecting the nature of a video source, by identifying original mode of the real time streaming digital video image input signal, comprising the steps of:

(a) receiving and characterizing the streaming digital video image input signal during a pre-determined time interval;

(b) assigning and characterizing a local neighborhood of neighboring pixels to each input image pixel of the streaming digital video image input signal, in a temporal interlaced sequence of three consecutive fields in a global input grid of pixels included in the streaming digital video input image signal, said three consecutive fields being a previous field, a next field, and a current field; and (c) determining the entropy of each virtual pixel, of each previous pixel, and of each next pixel, in said temporal interlaced sequence of said three consecutive fields, relative to said assigned and characterized local neighborhoods of said neighboring pixels, said determining comprising the steps of:

(i) calculating values of pixel inter-local neighborhood parameters for each said previous pixel in said previous field, and for each said next pixel in said next field, whereby each said value of each said pixel inter-local neighborhood parameter represents a regional sum of inter-local neighborhood weighted distances measured between said neighboring pixels located in subsets of said assigned and characterized local neighborhood of each said virtual pixel in said current field, and said assigned and characterized local neighborhood of each said previous pixel in said previous field, and of each said next pixel, in said next field, respectively;

(ii) calculating a value of a virtual-pixel intra-local neighborhood parameter, for each said virtual pixel in said current field;

(iii) adjusting a value of a pixel entropy counter for each said previous pixel in said previous field, for each said next pixel in said next field, and for each said virtual pixel in said current field;

(iv) calculating a value of the entropy of each said previous pixel in said previous field, of each said next pixel in said next field, and of each said virtual pixel in said current field, from said values of said pixel entropy counters of said pixels;

(d) defining and adjusting a value of fluctuation of said value of the entropy of each said virtual pixel in said current field in said global input grid of said pixels included in the streaming digital video input image signal, thereby further characterizing said value of the entropy of each said virtual pixel in said current field; and (e) assigning a real value to each said virtual pixel in said current field in said global input grid of said pixels in the streaming digital video input image signal, whereby said real values of said virtual pixels in the streaming digital video input image signal correspond to identification of the original mode of the real time streaming digital video image input signal.

31. The method of claim 30, whereby in step (a) the streaming digital video image input signal is received following subjecting the streaming digital video image input signal to a pull down mode conversion method selected from the group consisting of a 3:2 pull down mode conversion method, a 2:2 pull down mode conversion method, and a scan rate conversion, other than the 3:2 pull down mode conversion and the 2:2 pull down mode conversion, from a non-interlaced film format or a progressive video format to an interlaced video format.

32. The method of claim 30, whereby step (b) further comprises:
(i) assigning a first local neighborhood of said neighboring pixels to each said virtual pixel within a missing horizontal line of said current field.

33. The method of claim 32, whereby step (b) further comprises:
(ii) assigning a second local neighborhood of said neighboring pixels to each said pixel located in said previous field, and to each said pixel located in said next field.

34. The method of claim 33, whereby pixels located in horizontal lines of a field previous to said previous field are selected for said assigning said second local neighborhood to each said previous pixel located in said temporal interlaced sequence of said three consecutive fields.

35. The method of claim 33, whereby pixels located in horizontal lines of a field next to said next field are selected for said assigning said second local neighborhood to each said next pixel located in said temporal interlaced sequence of said three consecutive fields.

36. The method of claim 33, whereby step (b) further comprises:
(iii) selecting a said previous pixel and a said next pixel as two sequential pixels in said previous field and in said next field, respectively.

37. The method of claim 30, whereby step (i) of step (c) further comprises:
(1) calculating values of two previous-pixel inter-local neighborhood parameters for each said previous pixel in said previous field, said value of each said previous-pixel inter-local neighborhood parameter represents a regional sum of inter-local neighborhood weighted distances measured between said pixels located in subsets of a first local neighborhood of each said virtual pixel, and a second local neighborhood of each said previous pixel.

38. The method of claim 30, whereby step (i) of step (c) further comprises;
(2) calculating values of two next-pixel inter-local neighborhood parameters for each said next pixel in said next field, said value of each said next-pixel inter-local neighborhood parameter represents a regional sum of inter-local neighborhood weighted distances measured between said pixels located in subsets of a first local neighborhood of each said virtual pixel, and a second local neighborhood of each said next pixel.

39. The method of claim 30, whereby in step (ii) of step (c), said value of said virtual-pixel intra-local neighborhood parameter represents a regional sum of intra-local neighborhood weighted distances measured between said pixels located in horizontal lines of a first local neighborhood of each said virtual pixel, and said pixels located in different horizontal lines within same said first local neighborhood of same said virtual pixel.

40. The method of claim 30, whereby in step (iii) of step (c) said value of each said entropy counter is adjusted according to results obtained by performing mathematical logical operations on said values of said pixel local neighborhood parameters and on said values of said virtual-pixel inter-local neighborhood parameter.

41. The method of claim 30, whereby step (iv) of step (c) is performed according to a sequence of mathematical logical operations performed on said values of said pixel entropy counters of said previous pixel in said previous field, said next pixel in said next field, and of said virtual pixel in said current field.

42. The method of claim 30, whereby step (iv) of step (c) includes use of evaluating an entropy function expressed in terms of said pixel entropy counters of each said previous pixel in said previous field, of each said next pixel in said next field, and of each said virtual pixel in said current field.

43. The method of claim 30, whereby step (iv) of step (c) further includes determining relative relationships among said entropy values of said pixels, by using said values of said pixel entropy counters of said pixels.

44. The method of claim 30, further comprising the steps of: (i) initializing and setting said value of said fluctuation of said value of the entropy equal to zero, for each said virtual pixel in said current field; and (ii) increasing said value of said fluctuation of said value of the entropy if there is a change in slope between sequential pairs of said neighboring pixels in said local neighborhood of said virtual pixel.

45. The method of claim 30, whereby said assigning is performed according to mathematical logical operations performed on said values of the entropy of said previous pixel in said previous field, said next pixel in said next field, and said virtual pixel in said current field.

46. The method of claim 30, whereby said real value assigned to a said virtual pixel in said current field is selected from the group consisting of real value of said previous pixel, and real value of said next pixel.

47. The method of claim 30, whereby said real value is assigned to a said virtual pixel in said current field according to a said value of fluctuation of said value of the entropy of said virtual pixel.

48. The method of claim 30, whereby said real value is assigned to a said virtual pixel in said current field according to a said value of fluctuation of said value of the entropy of said virtual pixel, by using a procedure of spline interpolation.

49. The method of claim 30, whereby said real value is assigned to a said virtual pixel in said current field according to a said value of fluctuation of said value of the entropy of said virtual pixel, by using a procedure of directional interpolation.

50. The method of claim 30, whereby said real value assigned to a said virtual pixel in said current field is equal to real value of said previous pixel and to real value of said next pixel.

51. The method of claim 30, further comprising the step of: (f) repeating steps (b) through (e) for a pre-determined plurality of additional said temporal interlaced sequences of three consecutive fields in said global input grid of frames featured in the streaming digital video input image signal, for generating a streaming digital video output image signal.

52. The method of claim 51, further comprising the step of: (g) displaying said streaming digital video output image signal on a display of a digital video image display device.

53. The method of claim 30, whereby the original mode of the real time streaming digital video image input signal is selected from the group consisting of a film movie mode, a video camera mode, a graphics mode, and a combination of said film movie mode, said video camera mode, and said graphics mode.

54. The method of claim 30, whereby said values of the entropy of each said previous pixel in said previous field, of each said next pixel in said next field, and of each said virtual pixel in said current field, in the streaming digital video input image signal are used for correcting an error produced during real time editing of the streaming digital video image input signal.

55. The method of claim 30, whereby said values of the entropy of each said previous pixel in said previous field, of each said next pixel in said next field, and of each said virtual pixel in said current field, in the streaming digital video input image signal are used for automatically deciding, by performing sequences of mathematical logical operations, not to use values selected from the group consisting of value of a said previous pixel in said previous field, and value of a next pixel in said next field, for assigning a real value to said virtual pixel in said current field in said global input grid of pixels featured in the streaming digital video input image signal, thereby correcting an error produced during real time editing of the streaming digital video image input signal.

56. A method determining entropy of a pixel of a real time streaming digital video image signal, for automatically correcting an error produced during real time editing of the real time streaming digital video image input signal, comprising the steps of:
  (a) receiving and characterizing the streaming digital video image input signal during a pre-determined time interval;
  (b) assigning and characterizing a local neighborhood of neighboring pixels to each input image pixel of the streaming digital video image input signal, in a temporal interlaced sequence of three consecutive fields in a global input grid of pixels included in the streaming digital video input image signal, said three consecutive fields being a previous field, a next field, and a current field; and
  (c) determining the entropy of each virtual pixel, of each previous pixel, and of each next pixel, in said temporal interlaced sequence of said three consecutive fields, relative to said assigned and characterized local neighborhoods of said neighboring pixels, said determining comprising the steps of:
    (i) calculating values of pixel inter-local neighborhood parameters for each said previous pixel in said previous field, and for each said next pixel in said next field, whereby each said value of each said pixel inter-local neighborhood parameter represents a regional sum of inter-local neighborhood weighted distances measured between said neighboring pixels located in subsets of said assigned and characterized local neighborhood of each said virtual pixel in said current field, and said assigned and characterized local neighborhood of each said previous pixel in said previous field, and of each said next pixel, in said next field, respectively;
    (ii) calculating a value of a virtual-pixel intra-local neighborhood parameter, for each said virtual pixel in said current field;
    (iii) adjusting a value of a pixel entropy counter for each said previous pixel in said previous field, for each said next pixel in said next field, and for each said virtual pixel in said current field; and
    (iv) calculating a value of the entropy of each said previous pixel in said previous field, of each said next pixel in said next field, and of each said virtual pixel in said current field from said values of said pixel entropy counters of said pixels, whereby said values of the entropy of each said previous pixel in said previous field, of each said next pixel in said next field, and of each said virtual pixel in said current field, in the streaming digital video input image signal are used for automatically deciding, by performing sequences of mathematical logical operations, not to use values selected from the group consisting of value of a said previous pixel in said previous field, and value of a next pixel in said next field, for assigning a real value to said virtual pixel in said current field in said global input grid of pixels featured in the streaming digital video input image signal, thereby correcting an error produced during real time editing of the streaming digital video image input signal.

57. The method of claim 56, whereby in step (a) the streaming digital video image input signal is received following subjecting the streaming digital video image input signal to a pull down mode conversion method selected from the group consisting of a 3:2 pull down mode conversion method, a 2:2 pull down mode conversion method, and a scan rate conversion, other than the 3:2 pull down mode conversion and the 2:2 pull down mode conversion, from a non-interlaced film format or a progressive video format to an interlaced video format.

58. The method of claim 56, whereby step (b) further comprises: (i) assigning a first local neighborhood of said neighboring pixels to each said virtual pixel within a missing horizontal line of said current field.

59. The method of claim 58, whereby step (b) further comprises: (ii) assigning a second local neighborhood of said neighboring pixels to each said pixel located in said previous field, and to each said pixel located in said next field.

60. The method of claim 59, whereby pixels located in horizontal lines of a field previous to said previous field are selected for said assigning said second local neighborhood to each said previous pixel located in said temporal interlaced sequence of said three consecutive fields.

61. The method of claim 59, whereby pixels located in horizontal lines of a field next to said next field are selected for said assigning said second local neighborhood to each said next pixel located in said temporal interlaced sequence of said three consecutive fields.

62. The method of claim 59, whereby step (b) further comprises: (iii) selecting a said previous pixel and a said next pixel as two sequential pixels in said previous field and in said next field, respectively.

63. The method of claim 56, whereby step (i) of step (c) further comprises:
  (1) calculating values of two previous-pixel inter-local neighborhood parameters for each said previous pixel in said previous field, said value of each said previous-pixel inter-local neighborhood parameter represents a regional sum of inter-local neighborhood weighted distances measured between said pixels located in subsets of a first local neighborhood of each said virtual pixel, and a second local neighborhood of each said previous pixel.

64. The method of claim 56, whereby step (i) of step (c) further comprises:
  (2) calculating values of two next-pixel inter-local neighborhood parameters for each said next pixel in said next field, said value of each said next-pixel inter-local neighborhood parameter represents a regional sum of inter-local neighborhood weighted distances measured between said pixels located in subsets of a first local neighborhood of each said virtual pixel, and a second local neighborhood of each said next pixel.

65. The method of claim 56, whereby in step (ii) of step (c), said value of said virtual-pixel intra-local neighborhood parameter represents a regional sum of intra-local neighborhood weighted distances measured between said pixels located in horizontal lines of a first local neighborhood of each said virtual pixel, and said pixels located in different horizontal lines within same said first local neighborhood of same said virtual pixel.

66. The method of claim 56, whereby in step (iii) of step (c) said value of each said entropy counter is adjusted according to results obtained by performing mathematical logical operations on said values of said pixel local neighborhood parameters and on said values of said virtual-pixel inter-local neighborhood parameter.

67. The method of claim 56, whereby step (iv) of step (c) is performed according to a sequence of mathematical logical operations performed on said values of said pixel entropy counters of said previous pixel in said previous field, said next pixel in said next field, and of said virtual pixel in said current field.

68. The method of claim 56, whereby step (iv) of step (c) includes use of evaluating an entropy function expressed in terms of said pixel entropy counters of each said previous pixel in said previous field, of each said next pixel in said next field, and of each said virtual pixel in said current field.

69. The method of claim 56, whereby step (iv) of step (c) further includes determining relative relationships among said entropy values of said pixels, by using said values of said pixel entropy counters of said pixels.

70. The method of claim 56, further comprising the additional step of:
   (d) defining and adjusting a value of fluctuation of said value of the entropy of each said virtual pixel in said current field in said global input grid of said pixels included in the streaming digital video input image signal, thereby further characterizing said value of the entropy of each said virtual pixel in said current field.

71. The method of claim 70, further comprising the steps of:
   (i) initializing and setting said value of said fluctuation of said value of the entropy equal to zero, for each said virtual pixel in said current field; and
   (ii) increasing said value of said fluctuation of said value of the entropy if there is a change in slope between sequential pairs of said neighboring pixels in said local neighborhood of said virtual pixel.

72. The method of claim 70, further comprising the additional step of:
   (e) assigning a real value to each said virtual pixel in said current field in said global input grid of said pixels in the streaming digital video input image signal.

73. The method of claim 72, whereby said assigning is performed according to mathematical logical operations performed on said values of the entropy of said previous pixel in said previous field, said next pixel in said next field, and said virtual pixel in said current field.

74. The method of claim 72, whereby said real value assigned to a said virtual pixel in said current field is selected from the group consisting of real value of said previous pixel, and real value of said next pixel.

75. The method of claim 72, whereby said real value is assigned to a said virtual pixel in said current field according to a said value of fluctuation of said value of the entropy of said virtual pixel.

76. The method of claim 72, whereby said real value is assigned to a said virtual pixel in said current field according to a said value of fluctuation of said value of the entropy of said virtual pixel, by using a procedure of spline interpolation.

77. The method of claim 72, whereby said real value is assigned to a said virtual pixel in said current field according to a said value of fluctuation of said value of the entropy of said virtual pixel, by using a procedure of directional interpolation.

78. The method of claim 72, whereby said real value assigned to a said virtual pixel in said current field is equal to real value of said previous pixel and to real value of said next pixel.

79. The method of claim 72, further comprising the step of:
   (f) repeating steps (b) through (e) for a pre-determined plurality of additional said temporal interlaced sequences of three consecutive fields in said global input grid of frames featured in the streaming digital video input image signal, for generating a streaming digital video output image signal.

80. The method of claim 79, further comprising the step of:
   (g) displaying said streaming digital video output image signal on a display of a digital video image display device.

* * * * *

UNITED STATES PATENT AND TRADEMARK OFFICE
CERTIFICATE OF CORRECTION

PATENT NO. : 7,271,840 B2
APPLICATION NO. : 10/284280
DATED : September 18, 2007
INVENTOR(S) : Segman It is certified that error appears in the above-identified patent and that said Letters Patent is hereby corrected as shown below:

Column 18, at line 14, delete "150," and insert --150),--.

Signed and Sealed this

Fifteenth Day of April, 2008

JON W. DUDAS
*Director of the United States Patent and Trademark Office*